United States Patent Office 2,875,204
Patented Feb. 24, 1959

---

2,875,204

2-AMINO-3-(p-CHLOROPHENYLIMINO) - 3,5-DIHYDRO-5-(p - CHLOROPHENYL) - PHENAZINE AND SALTS THEREOF

Vincent Christopher Barry, Rathgar, Dublin, James Gabriel Belton, Terenure, Dublin, Michael Laurence Conalty, Dublin, and Dermot Twomey, Terenure, Dublin, Ireland, assignors, by mesne assignments, to Geigy Chemical Corporation, New York, N. Y., a corporation of Delaware No Drawing. Application November 4, 1955
Serial No. 545,101

Claims priority, application Switzerland
November 8, 1954

2 Claims. (Cl. 260—267)

The present invention is concerned with phenazine derivatives which have chemotherapeutically valuable properties.

As M. Schöpf, B. 23, 1843 first observed, on oxidising N-phenyl-o-phenylene diamine with ferric chloride, a dyestuff results which was identified by O. Fischer and O. Heiler, B. 26, 381 as 2-anilino-3.5-dihydro-3-imino-5-phenyl phenazine (anilino-aposafranine or anilido phenyl induline) of the formula:

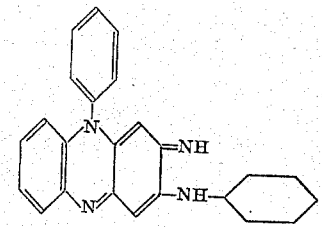

(I)

Then Kehrmann considered the isomeric constitution:

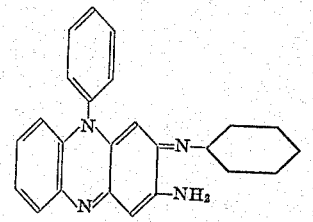

(II)

see B. 28, 350 (1895) but he was convinced of the accuracy of the Fischer formulation in particular by the degradation to the 2-anilino-aposafranine, by O. Fischer and co-workers, B. 26, 382, B. 29, 364, B. 29, 1604. The compound of the formula suggested by Kehrmann and substitution products thereof could not be isolated from the raw products obtained on the oxidation with ferric chloride.

Lately, 2-anilino-3.5-dihydro-3-imino-5-phenyl phenazine as well as analogues and substitution products thereof have become of interest because of their activity against the tubercle bacillus, see Nature 162, 622–23 (1948).

Most surprisingly it has now been found that the mineral acid salts of the isomeric compound in which the 3-imino group is aryl substituted instead of the 2-amino group and which corresponds to the formula:

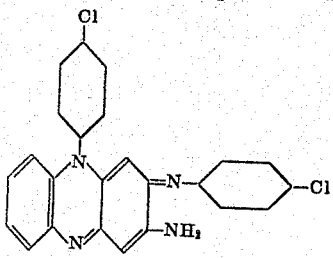

(III)

can be produced in a simple way by oxidising mineral acid salts of the compound of the formula:

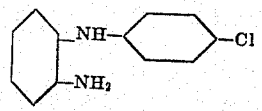

(IV)

in an aqueous solution with p-benzoquinone. By the use of benzoquinone instead of ferric chloride as oxidising agent, a new group of compounds is attained which is of chemotherapeutical value, in particular for the treatment of tuberculosis and leprosy. That benzoquinone is at all suitable for the oxidation of the N-aryl-o-phenylene diamines, i. e. compounds with a primary basic amino group, was just as unlikely to have been foreseen as the fact that the isomer with p-chlorophenyl-substituted 3-imino group (Formula III) which up to the present have not yet been isolated, would result from this oxidation. Compared with the corresponding isomers analogous to Formula I which are aryl substituted at the amino nitrogen atom, they have been found to have a stronger tuberculostatic action in pharmacological trials on animals. This is also the case when compared with p-amino salicyclic acid and the most active thiosemicarbazones. In particular it should be stressed that their inhibitive action on tubercle strains which have become resistant to isonicotinic acid hydrazide is stronger than their inhibitive action on tubercle strains which have the normal sensitivity to isonicotinic acid hydrazide. For this reason they may be used in combined therapy, e. g. with isonicotinic acid hydrazide or other tuberculostatically active compounds.

It is of advantage to perform the oxidation at a moderately high temperature, e. g. 50–70°, while using 1 to 2 mols of benzoquinone per one mol of N-p-chlorophenyl-o-phenylene diamine. The anhydro base of the Formula III can be liberated from its mineral acid salts e. g. by means of alcoholic alkalies. Isomeric compounds analogous to Formula I result as side products, most of which have better solubility in benzene and, in the form of their hydrochlorides are more easily soluble for example in alcohol. It is thus generally easy to separate the desired base of the Formula III or the hydrochlorides thereof from the solutions of the corresponding mixtures, to a great extent by allowing them to crystallise.

To obtain chemotherapeutical active substances however, it is not necessary to attain the base of the Formula III free from their isomers as, in some circumstances, the latter can be active themselves and the two isomers can probably have a synergistic effect.

The following example illustrates the production of the new compounds. Parts are given as parts by weight and the temperatures are in degrees centigrade.

*Example*

12.2 parts of N-(4-chloro-phenyl)-o-phenylene diamine hydrochloride dissolved in 300 parts of hot water were added dropwise while stirring to a solution of 9 parts of benzoquinone in 200 parts of hot water (60°). The dark precipitate which formed was boiled with alcoholic sodium hydroxide solution, the base mixture obtained was dried and dissolved in hot benzene whereupon a crystalline substance precipitated. After further recrystallisation from benzene, the 2-amino-3-(p-chlorophenylimino)-3.5-dihydro-5-(p-chlorophenyl)-phenazine was obtained in the form of dark red shining needles which contained one mol of benzene, M. P. 233–236°.

What we claim is:

1. A member selected from the group consisting of 2-amino-3-(p-chlorophenylimino) - 3,5 - dihydro - 5 - (p-chlorophenyl)-phenazine and the mineral acid salts thereof.

2. 2-amino-3-(p-chlorophenylimino) - 3,5 - dihydro-5-(p-chlorophenyl)-phenazine.

References Cited in the file of this patent

Barry et al.: Nature, volume 162, pages 622–623 (1948).
Berichte, 29:1607.
Berichte, 64:2772.
Proc. Royal Irish Acad. 55:150–52 inc. (1953).